United States Patent [19]

Bigelow et al.

[11] Patent Number: 5,426,535
[45] Date of Patent: Jun. 20, 1995

[54] APPARATUS FOR REMOVING AIR FROM BETWEEN A MASTER MAGNETIC MEDIUM AND A SLAVE MAGNETIC MEDIUM PRECEDING ANHYSTERETIC TRANSFER OF SIGNALS FROM MASTER TO SLAVE

[75] Inventors: Donald O. Bigelow, Webster; Thomas W. Palone, Rochester; Jayson J. Nelson, Webster, all of N.Y.

[73] Assignee: Eastman Kodak Company, Rochester, N.Y.

[21] Appl. No.: 99,041

[22] Filed: Jul. 29, 1993

[51] Int. Cl.⁶ .............................................. G11B 5/86
[52] U.S. Cl. .......................................... 360/16; 360/17
[58] Field of Search .................. 360/17, 16, 130.21, 360/15; 428/1

[56] References Cited

U.S. PATENT DOCUMENTS

| | | | |
|---|---|---|---|
| 2,796,223 | 6/1957 | Detweiler | 242/75.3 |
| 2,918,537 | 12/1959 | Camras | 179/100.2 |
| 3,037,090 | 5/1962 | Bouzemburg | 179/100.2 |
| 3,161,120 | 12/1964 | Timares et al. | 95/75 |
| 3,346,209 | 10/1967 | Cronin | 242/66 |
| 3,472,971 | 10/1969 | VanDenBerg | 179/100.2 |
| 3,544,732 | 1/1970 | Bauer et al. | 179/100.2 |
| 3,573,390 | 1/1970 | Frost et al. | 179/100.2 E |
| 3,630,424 | 12/1971 | Rau | 226/95 |
| 3,703,612 | 11/1972 | Higashida et al. | 179/100.2 |
| 3,733,711 | 5/1973 | Haythornthwaite | 34/23 |
| 3,752,925 | 8/1973 | Smaler | 179/100 |
| 3,756,610 | 9/1973 | Naegele et al. | 360/130.21 |
| 3,777,075 | 12/1973 | Hendershot, III et al. | 179/100.2 |
| 3,813,688 | 5/1974 | Dolby et al. | 360/17 X |
| 3,874,997 | 4/1975 | Kankaanpää | 162/290 |
| 3,893,167 | 7/1975 | Stahler | 360/17 |
| 3,913,813 | 10/1975 | Morse | 226/21 |
| 4,190,475 | 2/1980 | Marschke | 156/157 |
| 4,213,159 | 7/1980 | King | 360/16 |
| 4,302,523 | 11/1991 | Audran et al. | 360/2 X |
| 4,381,212 | 4/1983 | Roberts | 156/473 |
| 4,441,263 | 4/1984 | Vedenpää | 34/115 |
| 4,698,700 | 10/1987 | Shirai | 360/16 |
| 4,698,701 | 10/1987 | Gantzhorn, Jr. et al. | 360/16 |
| 4,716,660 | 1/1988 | Thiele | 34/114.2 |
| 4,726,532 | 2/1988 | Holm | 242/65 |
| 4,789,110 | 12/1988 | Sakaguchi et al. | 242/67.1 |
| 4,882,636 | 11/1989 | Billings et al. | 360/16 |
| 4,889,269 | 12/1989 | Long et al. | 226/97 |
| 4,892,243 | 1/1990 | Long et al. | 226/97 |
| 5,097,278 | 3/1992 | Tamamura et al. | 354/105 |
| 5,108,666 | 4/1992 | Zeroni et al. | 428/1 |
| 5,179,475 | 1/1993 | McClure | 360/17 |

FOREIGN PATENT DOCUMENTS

| | | |
|---|---|---|
| 138117 | 6/1948 | Australia . |
| 0472364A1 | 2/1992 | European Pat. Off. ...... G11B 31/00 |
| 2262037 | 6/1974 | Germany . |
| 55-119649 | 9/1980 | Japan . |
| 1-88921 | 4/1989 | Japan . |
| 7211934 | 9/1972 | Netherlands . |

*Primary Examiner*—Aristotelis Psitos
*Assistant Examiner*—Larry T. Cullen
*Attorney, Agent, or Firm*—Charles E. Snee, III

[57] ABSTRACT

A prerecorded magnetic master web (54) and an unrecorded magnetic slave web (14), such as a photographic film having a magnetic coating, are brought into intimate contact for anhysteretic recording by wrapping the moving master web partially around a small diameter gimballed roller (66) positioned in close proximity to a rotating transfer drum (36); wrapping the moving slave web partially around a larger idler roller (34) positioned in close proximity to both the gimballed roller and the transfer drum; wrapping the slave web partially around the transfer drum with the master web wrapped outside the slave web; and evacuating a chamber or volume (68) formed among the webs, rollers and drum, to remove air from between the webs and cause them to converge into intimate contact at a nip upstream of a signal transfer zone in which a magnetic head (70) applies a decaying magnetic field to cause anhysteretic transfer from the master web to the slave web.

25 Claims, 5 Drawing Sheets

APPARATUS FOR REMOVING AIR FROM BETWEEN A MASTER MAGNETIC MEDIUM AND A SLAVE MAGNETIC MEDIUM PRECEDING ANHYSTERETIC TRANSFER OF SIGNALS FROM MASTER TO SLAVE

TECHNICAL FIELD

This invention relates to anhysteretic recording apparatus in which signals on a master magnetic medium are transferred to a slave magnetic medium while the media travel in intimate contact and without relative motion through a signal transfer zone. More particularly, the invention concerns such apparatus which is capable of attaining recording speeds, for example, in excess of 100 inches per second (2540 mm per second). The invention is especially suitable for transferring magnetically encoded information from a thin master web coated with a high coercivity magnetic medium to a substantially thicker photographic film web coated on one side with a photosensitive coating and on the opposite side with a transparent, low density slave magnetic medium. The slave magnetic medium may also be cocast into the support surface opposite the photosensitve coating.

BACKGROUND ART

Apparatus and methods are known for making duplicate magnetic records using anhysteretic or thermoremanent transfer. Typically, a web on which the master recording has been made and a web onto which a mirror image of the master recording is to be transferred are caused to travel in intimate contact through a signal transfer zone where a decaying, alternating magnetic field is applied for anhysteretic recording or a beam of energy is applied for thermoremanent transfer. Inadequate contact or slippage between the master and slave introduces modulation and distortion of the magnetic signal being transferred. Such distortion affects signal quality and may introduce errors in digital data signals which are transferred to the slave. The problem of maintaining intimate contact between the master and slave webs is aggravated when the webs are driven at speeds in excess of 60 inches per second (1524 mm per second) and when the webs are as wide as 1.37 inches (35 mm). At such speeds the webs are likely to entrain boundary layers of air which tend to separate them, in spite of tension or pressure applied to the webs. The difficulty of obtaining the required intimate contact between wider master and slave webs in the signal transfer zone has limited use of contact duplication processes for such webs, particularly when highly reliable transfer is required.

In order to maintain intimate contact in the signal transfer zone it has been proposed to use pressure pads, pressure rollers or belts and air clamps. Various air or pneumatic clamp designs have been proposed, some including vacuum clamps. Where excess air pressure has been used to press the webs into contact, as much as five times atmospheric pressure has been used for narrower webs. The large number of proposals for providing intimate contact between the master and slave webs indicates that the problem of obtaining the desired intimate contact still awaits a satisfactory solution, particularly for wider webs.

The problem concerns removal of the entrained air in the boundary layers which attach themselves to the master and slave webs and are retained between the webs after they are brought into contact. This problem differs from the problem of air trapped between the convolutions of a web while it is being wound onto a reel. Such trapped air can change winding tension and prevent compact and uniform winding. In such applications, a vacuum has been used to eject air from between the incoming web and the preceding convolution on the reel. In such prior art apparatus, the differential pressure caused by the vacuum acts perpendicularly to the web and can cause jitter of the web, which is not a problem when a web is being wound onto a reel. But, such jitter can affect adversely the relative positions of master and slave webs and introduce distortion in a transferred magnetic signal.

The slave or copy web in some applications may be a photographic film. The magnetic recording medium on the slave web may be of the type shown in commonly assigned U.S. Pat. Nos. 3,782,947 and 4,302,523; in Research Disclosures Item 34390 of November 1992; and in commonly assigned published International Application WO91/11750. For photographic applications, it is desired to record, particularly along an edge or both edges of the film, magnetic signals which can be played back in a camera or photo finishing machine to set the camera for picture taking or the photo finishing machine for processing of an exposed film. The problem of contact duplication is particularly difficult when the slave web is photographic film, since damage must be prevented to the photosensitive layer or emulsion on the film. The master web may be of the type disclosed in commonly assigned, copending, allowed U.S. application Ser. No. 811,386 filed 20 Dec. 1991.

SUMMARY OF THE INVENTION

A principal object of the invention is to provide improved apparatus for transferring signals from a master web to a slave web wherein the foregoing difficulties are eliminated and without requiring pressure pads, air clamps or the like.

Another object of the invention is to provide improved apparatus which enables boundary layers of air to be removed as a master web and a slave web converge to form a signal transfer zone in which the webs are in intimate contact.

A more specific object of the invention is to provide apparatus which removes boundary layer air just upstream of a nip where the master and slave webs converge, before the air becomes trapped between the webs, thereby improving signal transfer and frictional coupling between the webs.

A still more specific object of the invention is to provide improved apparatus for transferring signals from a master web to a slave web in which the webs are wrapped together about a segment of a transfer drum. A zone is defined on the periphery of the drum in which signal transfer occurs. Guide rollers are provided about which the webs are wrapped so as to cause the webs to converge at a nip adjacent a chamber defined by the webs, the rollers and the drum. The webs and one of the rollers define the edge walls of the chamber from which air is withdrawn in a transverse direction essentially parallel to surfaces of the webs, without applying such a differential pressure to the surfaces of the webs as would cause them to jitter from their desired paths into intimate contact while supported on the drum.

A still further object of the present invention is to provide improved web transport apparatus especially suitable for use in a system for transferring signals from a thin master web to a substantially thicker slave web supported on a transfer drum. Due to the anticlastic effect, the slave web forms a radially outwardly open nest where the slave web is wrapped partially about the transfer drum. An outward edge curl of greater displacement from the surface of the transfer drum is formed by the thicker slave web than by the thinner master web. As a result, the thinner master web is disposed within the nest of the slave web; so that, the edges of the thinner web are maintained in intimate contact with the edges of the thicker web to achieve good anhysteretic transfer as the webs move with the drum.

Briefly described, apparatus for transferring signals from a first to a second recording medium carried respectively by first and second webs comprises means for transporting the webs under tension along paths which converge to form a signal transfer zone in which the webs are in intimate contact without relative motion. A vacuum chamber is defined between the converging webs, the chamber having edge walls defined in part by the webs as they converge. The webs may be guided by rollers and wrapped partially around a transfer drum; so that, the rollers, drum and the webs provide rolling seals at the edges of the chamber. Both webs are suitably tensioned to prevent slippage on the rollers and to provide web stability around the vacuum chamber. Air is withdrawn from the chamber to form a partial vacuum so that air cannot be entrained between the webs in the transfer zone and interfere with intimate contact. One of the webs may be thinner than the other so that a nest is formed in the thicker web as it travels around the drum, in which the thinner web is captured so as to ensure intimate contact at the edges of the webs. The thicker web may be the slave web which is driven by a separate capstan or the transfer drum acting as a capstan. The master web is driven in synchronism with the slave web due to the frictional coupling generated by tension and air pressure differential as the webs travel together around the transfer drum in intimate contact with each other.

The invention provides various important advantages. The edges of the master web are placed in intimate contact with the edges of the slave web which facilitates long wavelength recording at the edges of the slave web, at densities of about 1000 bits per inches (39.37 bits per mm), using a slave web having a thickness up to 0.0057 inches (0.00145 mm) at speeds in excess of 60 inches per second (1524 mm per second). Speeds as high as 120 inches per second (3048 mm per second) have been used to provide high quality transfer. The invention is substantially quieter than prior art systems using air pressure clamps to provide an intimate interface. Photographic films which are pressure and scratch sensitive can be transported without touching the image portion of the film, by using a transfer drum having a relieved or recessed cylindrical surface. The apparatus and the master web are readily manufactured using conventional techniques. By placing the thinner master web outboard of and nested into the thicker slave web on the transfer drum, advantage is taken of the otherwise troublesome anticlastic effect to ensure intimate contact between the edges of the master and slave webs. Use of a master web which is slightly narrower than the slave web ensures that edge burrs on the thicker, more roughly cut slave web will not interfere with intimate contact. The vacuum chamber formed by the webs and rollers is self regulating due to its side ported vacuum outlets and the rolling seals formed by the webs. Very good signal transfer is achieved as shown by transfer bit error rates better than two bit errors in a million.

BRIEF DESCRIPTION OF THE DRAWINGS

The foregoing and other objects, features and advantages of the invention as well as a description of a presently preferred embodiment will become more apparent from a reading of the following description in connection with the accompanying drawings in which.

DESCRIPTION OF THE PREFERRED EMBODIMENTS

Overall Arrangement and Operation

Figure 1:
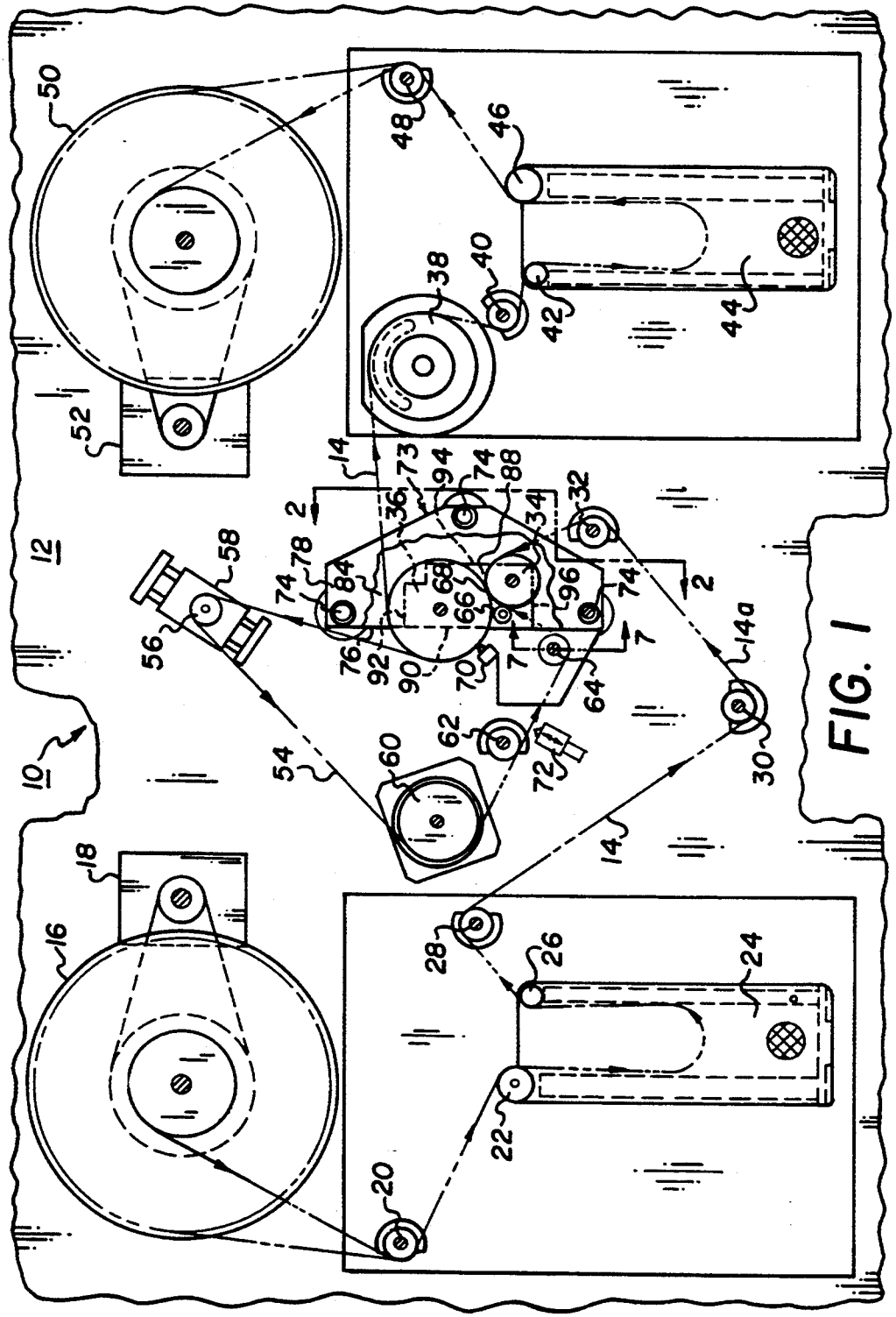
FIG. 1 is a front view of an apparatus for direct contact anhysteretic duplication, embodying the invention.

As illustrated in FIG. 1, an apparatus 10 embodying the invention for anhysteretically transferring signals is supported on an essentially vertical face plate 12. An indeterminate length of web 14 bearing a slave magnetic medium, such as photographic film of the type previously mentioned, is wound with its photographic emulsion side 14a facing outwardly on a supply spool or reel 16 which may hold several thousand feet or meters of film. A motor 18 is used to drive reel 16 to feed slave web 14 into the apparatus, with the plane of the web generally perpendicular to the plane of face plate 12. After leaving reel 16, slave web 14 wraps partially around a flanged idler roller 20, passes over an idler roller 22 and into a conventional vacuum box 24 from which it exits over an idler roller 26. Vacuum box 24 maintains within itself an essentially constant length, open loop of slave web 14, thereby maintaining tension on slave web 14 while isolating the remaining components of the apparatus from tension transients caused by the drive for supply reel 16. For the slave web discussed later in this specification, tension in the range of 0.5 to 1.25 pounds (227 to 568 gm) was suitable. In the conventional manner, loop length detectors and servo mechanisms, not illustrated, are used to control motor 18 and maintain the desired range of lengths of loop within the vacuum box. Additional vacuum boxes may be used to accommodate higher duplicating speeds.

From idler roller 26, slave web 14 wraps partially around flanged idler rollers 28, 30 and 32 before wrapping partially around a slave idler roller 34 over an arc of approximately 90 degrees and then wrapping partially around an idler transfer drum 36 over an arc in the range of 90 to 270 degrees. While slave web 14 is moving with transfer drum 36, signals are transferred to the slave web in the manner to be described shortly in this specification.

From transfer drum 36, slave web 14 wraps partially around a conventional ported vacuum metering drum 38 which is driven continuously, to move slave web 14 with transfer drum 36 and to maintain proper tension during signal transfer on drum 36. In the well known manner, drum 38 holds slave web 14 snugly against its peripheral surface by application of vacuum and serves as a capstan. Alternatively, transfer drum 36 could be driven and used as the capstan, in which event vacuum drum 38 would not required. From vacuum drum 38, slave web wraps partially around a flanged idler roller 40, passes over an idler roller 42 and into a further conventional vacuum box 44 from which it exits over an idler roller 46. From idler roller 46, slave web 14 wraps partially around a flanged idler roller 48 and then passes to a take-up spool or reel 50 driven by a motor 52. Vacuum box 44 also maintains within itself an essentially constant length, open loop of slave web 14, thereby maintaining tension on slave web 14 while isolating the remaining components of the apparatus from tension transients caused by the drive for take-up reel 50. As in the case of vacuum box 24, loop length detectors and servo mechanisms, not illustrated, are used to control motor 52 and maintain the desired range of lengths of loop within the vacuum box. Additional vacuum boxes may be used to accommodate higher duplicating speeds. Those skilled in the art will appreciate that flanged idler roller 20, 28, 30, 32, 40 and 48 and rollers 22, 26, 42 and 46 could be air bars.

An endless loop is formed by butt splicing a length of web 54 bearing a master magnetic medium and is wrapped partially around an unflanged idler roller 56 supported by a conventional, low inertia, resilient tensioner 58 which can maintain a tension in the range of 12 to 24 ounces (340 to 680 gm) on master web 54. The properties of webs 14 and 54 are discussed subsequently in more detail. The magnetic medium on master web 54 faces outwardly of the endless loop. From idler roller 56, master web 54 wraps partially around an air flotation idler or air bar 60 of the known type illustrated in FIGS. 8 and 9. From there, master web 54 passes just below a flanged idler roller 62 normally used only when signals are being recorded onto the master web in the manner to be described shortly. After passing roller 62, master web 54 wraps partially around a flanged master guide roller 64 of the type illustrated in FIG. 7, over an arc in the range approximately 90 degrees. After passing guide roller 64, master web 54 wraps partially around a small diameter, gimballed roller 66 of the type illustrated in FIG. 6, over an arc of approximately 90 degrees. From gimballed roller 66, master web 54 wraps partially around transfer drum 36 with the magnetic medium of the master web in intimate contact with the magnetic medium of the underlying slave web 14.

Figure 3:
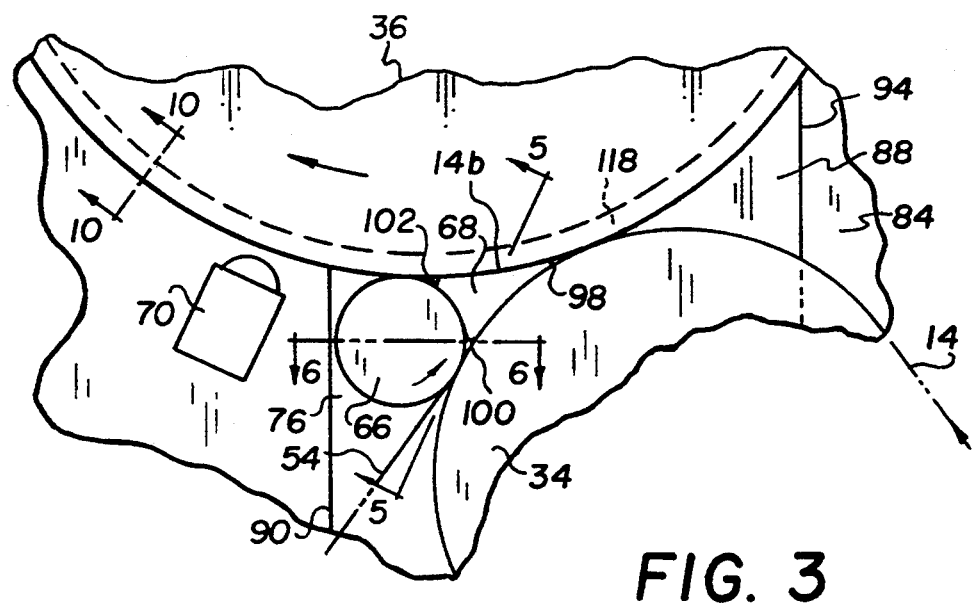
FIG. 3 is an enlarged, fragmentary view showing the transfer drum and rollers which guide the master and slave webs; so that, they converge at a nip upstream of the signal transfer zone.

As illustrated, gimballed roller 66 is positioned in close proximity to both slave idler roller 34 and transfer drum 36. As best seen in FIG. 3, as a result of this arrangement, an essentially triangular vacuum chamber or volume 68 is defined or formed among (i) slave web 14 as it moves from idler roller 34 to transfer drum 36; (ii) idler roller 34 between the point of departure of slave web 14 and the point of closest proximity to gimballed roller 66; and (iii) master web 54 as it wraps gimballed roller 66 and moves into contact with slave web 14. Idler roller 34 and transfer drum 36 are sized for ease of manufacture, an adequately large cross secion for volume 68, minimum air entrainment, adequate length of the transfer zone and proper interaction of the rollers with the thicker, stiffer slave web.

A magnetic bias head 70 preferably is positioned as closely as possible to the nip or point near gimballed roller 66 where slave web 14 and master web 54 come into contact, to provide the decaying magnetic field needed for complete anhysteretic transfer, before air eventually leaks back between the webs and degrades the intimate contact required for good signal transfer. Alternatively, an angled array of permanent magnets could be used to provide the necessary magnetic field. The arc between bias head 70 and the nip or point of intimate contact between the webs is referred to in this specification as the signal transfer zone, where information on master web 54 is transferred to slave web 14.

Various components of the apparatus will be discussed in greater detail subsequently; however, the overall operation of the apparatus may now be understood. As slave web 14 is driven through the apparatus by motors 18 and 52 and vacuum drum 38, frictional engagement between slave web 14 and master web 54 pulls the endless loop of master web 54 around the circuit defined by idler roller 56, air flotation idler 60, master guide roller 64, gimballed roller 66 and transfer drum 36. In a manner to be described, in accordance with the invention, volume 68 is connected to a source of reduced pressure which partially evacuates air from volume 68 and the surfaces of webs 14, 54, which otherwise would prevent intimate contact between the webs in the signal transfer zone. The loop of master web 54 may be prerecorded with information to be transferred to slave web 14. Alternatively, a movable master recording head 72 may be provided as illustrated schematically in FIG. 1, between flanged idler roller 62 and master guide roller 64; so that, recording head 72 may be moved into contact with master web 54, thereby causing the master web to engage idler roller 62 while new or additional information is added to the loop of master web 54.

Due to the frictional coupling between the master and slave webs on the drum 36, the slave web drives the master web. The loop of master web 54 and slave web 14 move over transfer drum 36 at the same speed, in synchronism with each other and without slippage so as to ensure accurate transfer or duplication of the magnetically recorded information from the master web to the slave web. Because a loop is used for master web 54, the transfer is replicated along the length of the slave web for each rotation of the loop, unless master recording head 72 has been engaged to provide new information with each revolution of the loop. Those skilled in the art will appreciate that master web 54 can also be transported from reel to reel with suitable isolation so as to provide requisite tension in the master web where the master and slave webs are in intimate contact for accurate signal transfer. Master recording head 72 could also be used with a reel to reel master web, to update the information on the web.

Evacuation of Volume 68

Figure 2:
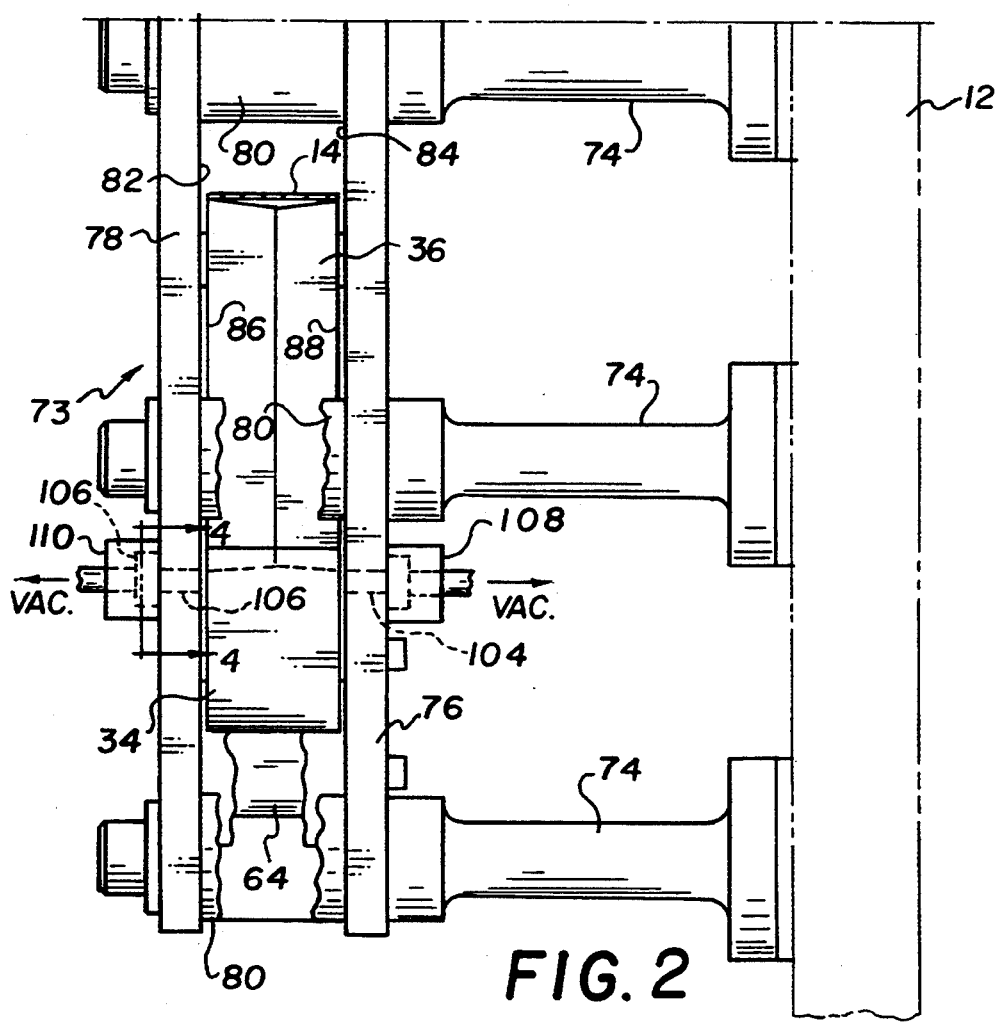
FIG. 2 is an end view, partially broken away, taken along line 2—2 of FIG. 1.

As illustrated in FIGS. 1 and 2, an air evacuation and anhysteretic transfer assembly 73 comprises several of the components just described. In the illustrated embodiment, three cantilevered support stanchions 74 are rigidly mounted to face plate 12 to support an inner support plate 76 and a parallel outer support plate 78, the two support plates being separated on stanchions 74 by a set of precisely ground spacer collars 80. Outer support plate 78 is partially broken away in FIG. 1 for ease of illustration. The parallel, opposing faces 82, 84 of support plates 76, 78 are provided with respective raised, ground-flat bosses 86, 88 which surround volume 68 on both sides and closely engage the opposite ends of slave idler roller 34, transfer drum 36 and gimballed roller 66. Slave idler roller 34, transfer drum 36, master guide roller 64 and gimballed roller 66 are each mounted for free rotation on posts or axles cantilevered from inner support plate 76. The close engagement of bosses 86, 88 with the rollers and drum helps to resist leakage of air into volume 68 during operation. To further resist leakage, labyrinth seals, not illustrated, may be provided on the end surfaces of the rollers and drum. The edges 90, 92, 94 and 96 of boss 88 can be seen in FIG. 1, the edges of boss 86 being mirror images. During thread up of assembly 73, outer support plate 78 is removed.

Figure 4:
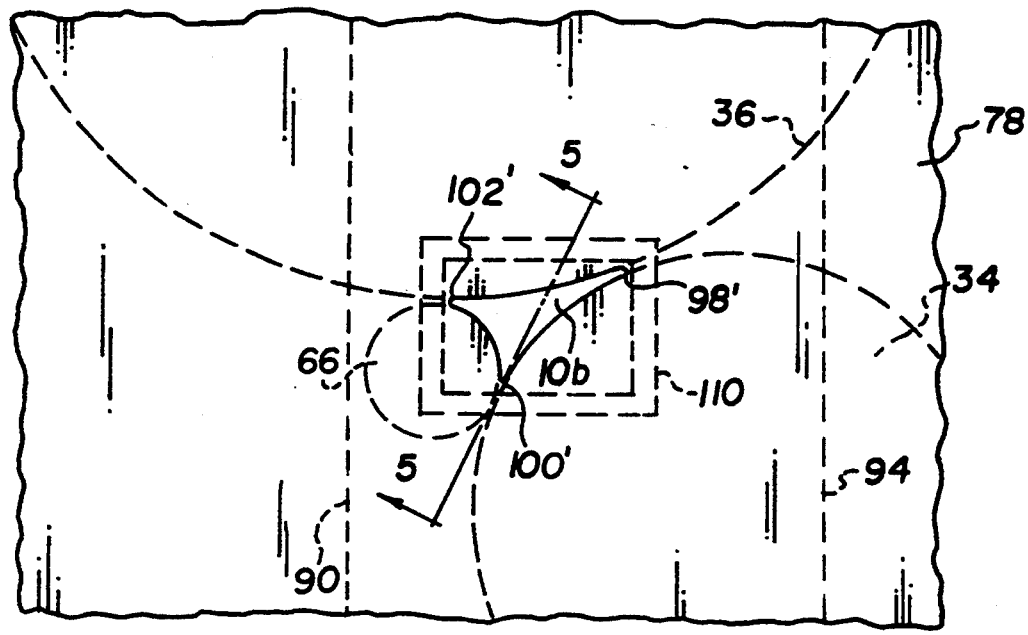
FIG. 4 is an enlarged, fragmentary view similar to FIG. 3, taken along the line 4—4 in FIG. 2.
Figure 5:
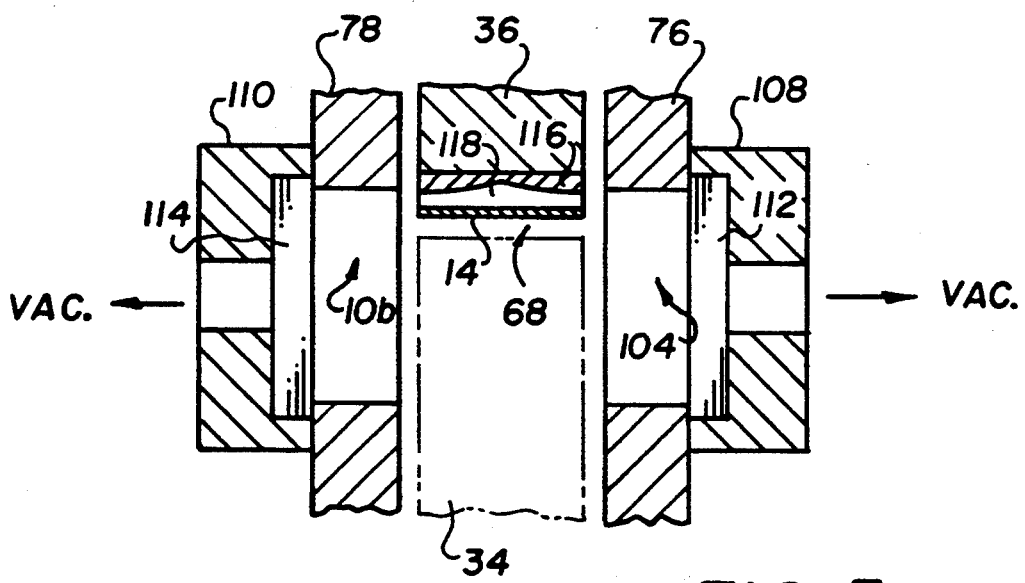
FIG. 5 is a fragmentary sectional view taken along the line 5—5 in FIGS. 3 and 4.

The shape of volume or vacuum chamber 68 is most clearly shown in FIGS. 3, 4 and 5. The cross section of volume 68 is nearly triangular, with curved walls and apices 98, 100 and 102. The side or edge walls of vacuum chamber or volume 68 are defined by slave web 14, slave idler roller 34 and master web 54, as previously indicated. The master and slave webs move continuously during the duplication process at speeds from 60 to 120 inches per second (1524 to 3048 mm per second). Due to this movement, rolling seals are formed at apices 98 and 102. The ends of volume 68 open through ports 104, 106 preferably provided through each of the respective thicknesses of support plates 76, 78, as best seen in FIGS. 4 and 5. However, a single port on one side of volume 68 would be suitable for some applications of the invention. Ports 104, 106 have generally the same size, shape and orientation as the cross section of volume 68 with apices 98', 100' and 102', as best seen in FIG. 4. A pair of vacuum manifolds 108, 110 are mounted respectively to support plates 76, 78 and surround ports 104, 106. Within the vacuum manifolds exhaust plenums 112, 114 are defined, which communicate through suitable fittings, not illustrated, to a reduced pressure or vacuum source. In operation, air is withdrawn from volume 68 through ports 104, 106 in directions across the widths of the master and slave webs. As a result of this flow path, no direct pneumatic force is applied perpendicular to the surfaces of the tensioned master and slave webs as they traverse volume 68, which prevents jitter of the webs and facilitates precise feeding of the webs to their contact point or nip at the entrance to the signal transfer zone. Removal of air from volume 68 ensures that slave web 14 and master web 54 will move into intimate engagement without relative movement in the signal transfer zone.

As previously indicated, air may leak into volume 68 through clearances between support plates 76, 78 and the rollers and drum. Another leakage path is at apex 100 between master web 14 as it moves over gimballed roller 66 and the nearby surface of slave idler roller 34. For a master web of the type disclosed in this specification, a clearance up to 0.010 inches (0.25 mm) was found to be effective. Any air entrained as a boundary layer on master web 54 as the web enters apex 100 is opposed by the oppositely moving boundary layer on slave idler roller 34, due to their opposing and equal peripheral velocities. The net effect is to reduce air leakage into volume 68 through the clearance at apex 100.

Transfer Drum 36

Figure 10:
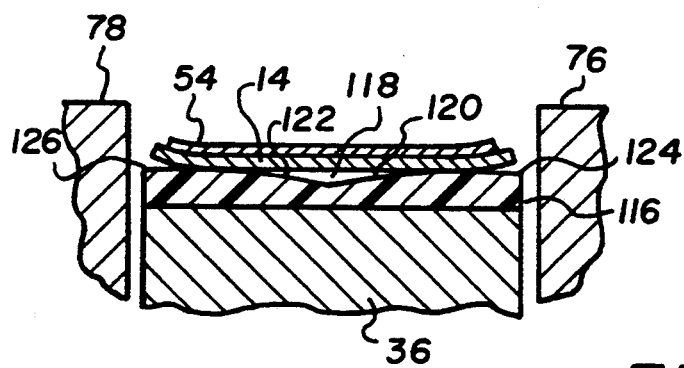
FIG. 10 is a fragmentary sectional view taken along line 10—10 in FIG. 3.

As shown in FIGS. 5 and 10, transfer drum 36 preferably comprises a thin exterior layer or shell 116 which may be formed of compliant, elastomeric plastic material having a hardness in the range of 70 to 90 Durometer, preferably a polyurethane which can be ground to a smooth, non-tacky finish with minimal circumferential runout. A layer 116 approximately 0.125 inches (3.175 mm) thick has been used with good results. Layer 116 preferably is provided with a central circumferential concavity or recess 118 formed by a pair of gently curved side surfaces 120, 122, leaving rims 124, 126 on the opposite sides of the recess 118. Rims approximately 0.2 inches (5.08 mm) in width have been used. The photographic emulsion side 14a of slave web 14 is disposed against the peripheral surface of drum 36 with the edges of slave web 14 contacting rims 124, 126. The central area of slave web 14 in which images are to be formed thus faces into recess 118 and is spaced from the peripheral surface of drum 36 so as to protect the emulsion against scraping or other damage, for example from dirt which may become embedded in exterior shell 116. The material of shell 116 also deflects slightly at local pressure points which would be formed by dirt flecks, thus further guarding against damage to the emulsion. The use of recess 118 also concentrates the normal pressure along the peripheral edges slave web 14, where anhysteretic signal transfer is to be achieved, thus further improving the intimate contact in the signal transfer zone.

Recess 118 also provides a significant leakage path for air into volume 68 due to a droop 14b of slave web 14 when vacuum is applied, as shown in phantom line in FIG. 3. The droop is a result of pressure forces normal to the web surface inducing tension forces along to web which balance against the web tension provided by the vacuum boxes. Thus, as will be discussed subsequently in this specification, should too strong a vacuum be applied through ports 104, 106, droop 14b of slave web 14 will enlarge to provide a larger leakage path which limits the strength of vacuum achievable in volume 68. At this point, a new balance is achieved and droop 14b stops enlarging. If recess 118 were not used, a much stronger vacuum could be achieved during droop of slave web 14, due the reduced leakage path. A transfer drum without a central recess would be advantageous if contact with the center of the slave web were not a concern.

Low Inertia, Low Friction Transport for Master Web 54

Because the endless loop of master web 54 is driven by frictional engagement with slave web 14, the transport for the loop preferably has low friction and inertia and maintains an essentially constant tension in the loop. Tensioner 58 maintains the necessary tension in the loop, while air flotation idler bar 60, master guide roller 64 and gimballed roller 66 provide low friction, low inertia guidance to web 54 as it approaches the signal transfer zone.

Figure 6:
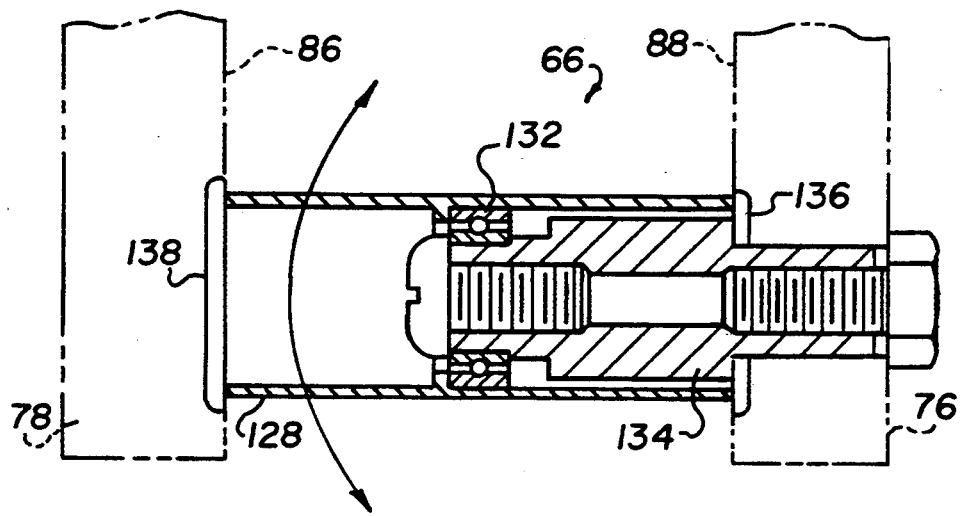
FIG. 6 is a sectional view taken along line 6—6 of FIG. 3, showing the gimballed master guide roller which guides the master web toward the nip where the webs converge.

As illustrated in FIG. 6, gimballed roller 66 comprises a hollow, right circular cylindrical tube 128 having a hard peripheral surface, such as hard coated aluminum or titanium. Tube 128 is provided near its midpoint with an internal, radially inwardly projected stop 130 which bears on the outer race of a ball bearing 132 whose inner race is mounted against a shoulder on a post 134 cantilevered from inner support plate 76. The axis of rotation of tube 128 is generally perpendicular to support plates 76, 78 which are provided with reliefs 136, 138 around the ends of tube 128. Due to normal play in bearing 132, tube 128 can tilt slightly about an axis generally perpendicular to the rotational axis of the tube, thus providing a sort of gimbal action. This tilt of the guide roller 66 accommodates small misalignments with the surface of drum 36, for example due to run out or tilt. It is, of course, desirable to minimize run out in the drum 36 and the plastic shell 116 providing the peripheral surface of the drum, such as by grinding the surface to high tolerances to minimize such run out.

The gimballed roller 66 preferably is of much smaller diameter than drum 36. For example, roller 66 may be about 0.5 inches (12.7 mm) in diameter. Master web 54 thus is caused to execute a tight arc which tends to prevent adherence of a boundary layer on the master web as the web passes around roller 66. Due to this tight arc and the opposite movement of slave idler roller 34, the boundary layer apparently separates from master web 54 to be more readily exhausted through volume 68.

Figure 7:
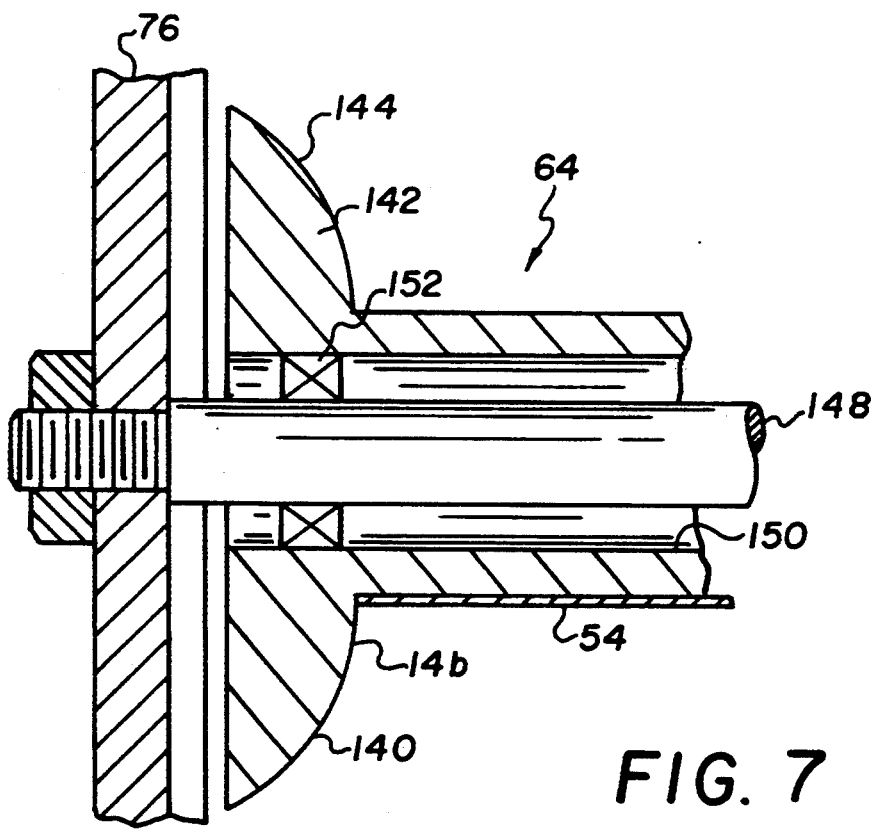
FIG. 7 is an enlarged, fragmentary sectional view taken along line 7—7 of FIG. 1, showing another guide roller which guides the master web to the roller illustrated in FIG. 6.

As illustrated in FIG. 7, flanged master guide roller 64 comprises a spool 140 having end flanges 142 with spherical surfaces 144 to control movement master web 54. The radially inner portions 146 of surfaces 144 preferably are perpendicular to the rotational axis of the spool. A central post 148 is cantilever mounted to support plate 76 and extends through a central bore 150 of spool 140, where the spool is supported by a pair of bearings 152. The edge guidance of master web 54 is very gentle along the spherical surface 144. This guidance avoids damage to the edge of the master web, such as burring, which could interfere with the desired intimate contact between the master and the slave webs in the signal transfer zone. Air flotation idler bar 60 and master guide roller 64 cooperate to laterally position master web 54 as it approaches gimballed roller 66.

Figure 8:
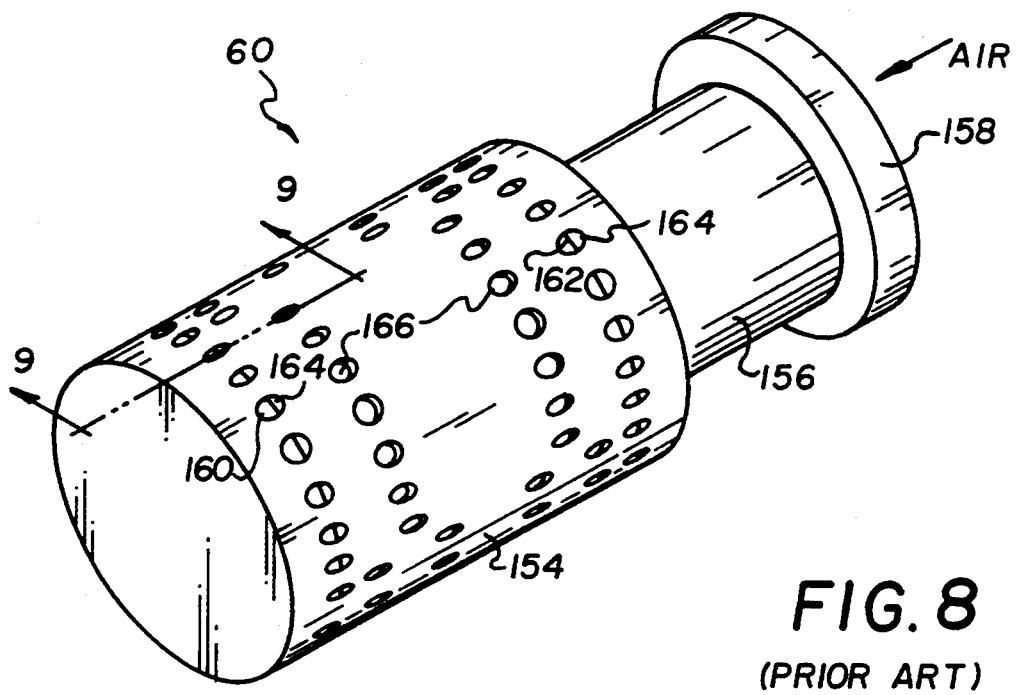
FIG. 8 is a perspective view of a known air flotation idler roller or air bar which is used in the apparatus of FIG. 1.
Figure 9:
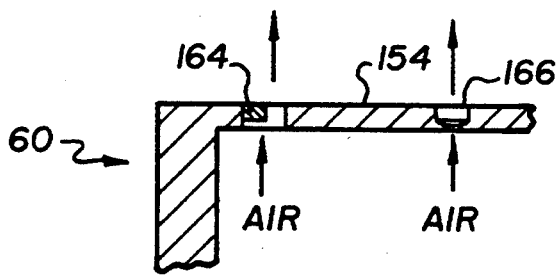
FIG. 9 is a fragmentary view taken along line 9—9 of FIG. 8.

As illustrated in FIGS. 8 and 9, air flotation idler bar 60 comprises a hollow drum 154 which mounted on a hollow post 156 secured by a mounting flange 158 to face plate 12. Circumferentially extending rows 160, 162 of radial holes are provided through the wall of drum 154 and are partially plugged by flat sided dowels 164. The flat sides of dowels 164 face each other along drum 154 to provide curtains of air which edge guide master web 54. Between rows 160, 162 are provided central rows 166 of radial holes through the wall of drum 154 to provide a film of air on which master web 54 will float as it passes over idler bar 60. Air flotation bars of this type are disclosed in greater detail in commonly assigned U.S. Pat. No. 4,889,269 which is incorporated by reference into this specification.

Intimate Contact Between Master and Slave Webs

The vacuum applied to volume 68 exhausts enough air from the volume upstream of the signal transfer zone; so that, minimal air is entrained between the master and the slave webs as they converge in the signal transfer zone. The atmospheric pressure against master web 54 forces the webs into intimate contact and this contact is enhanced by the nested relationship of the master in the slave as discussed subsequently in this specification.

The pressure in volume 68 is automatically self-adjusting in accordance with the tension in slave web 14. Also, the pressure in volume 68 tends to increase toward ambient pressure if the vacuum applied through ports 104, 106 becomes too strong; that is, reaches too low a level. The vacuum in plenum 112, 114 preferably is in the range 2.0 to 7.0 inches (51 to 178 mm) of mercury. This is because the cross sectional area of volume 68 decreases upon application of vacuum due to droop 14b of slave web 14 into volume 68, as shown in phantom line in FIG. 3. Because volume 68 is side ported, pressure within volume 68 is maintained at a level that can be supported by the tension in slave web 14. The slave web cannot be pulled into either of ports 104, 106 and damaged, which can be a problem in systems where the vacuum acts perpendicular to the surface of the webs. In operation, the vacuum is set to a level which just overcomes the tension in slave web 14. The effective size and shape of ports 104, 106 are thus determined, since the areas of the ports exposed to volume 68 will change in operation in accordance with droop 14b between the signal transfer zone and slave idler 34. When droop 14b increases, this increases air leakage at atmospheric pressure from recess 118 of transfer drum 36 under slave web 14 and into volume 68. The resultant increase in air flow through side ports 104, 106 causes the pressure in volume 68 to increase; that is, the vacuum loses strength and approaches ambient pressure in volume 68. Reduction in the strength of the vacuum in volume 68 inhibits any increase in the magnitude of droop 14b, and maintains the equilibrium position. The relieved transfer roll 36 also provides a pathway to ambient pressure once the slave droops past the perimeter of the ports 104, 106. The evacuation process is therefore self-regulating. As previously indicated, stronger vacuum is maintained in volume 68 if no recess is provided in the transfer drum. A vacuum lever of approximately 2.0 inches (51 mm) of mercury, a tension in master web 54 of approximately 0.8 pounds (366 grams), a tension in slave web 14 of approximately 0.75 pounds (341 grams) and a web speed of 120 inches (3048 mm) per second, resulting in a transfer bit error rate of only 1.2 bit errors per million.

The desired intimate contact between slave web 14 and master web 54 is enhanced due to the anticlastic effect, which causes a radially outward curl of the edges of a web wrapped onto a drum. The enhanced contact is due to differences in the material properties and geometry of the master web compared to those of the slave web. Slave web 14 is much thicker than master web 54. For example, the slave web may be 0.0057 inches (0.144 mm) thick, while the master may be only 0.0024 inches (0.061 mm) thick, a thickness ratio of greater than 2 to 1. For a slave web having a base of cellulose acetate of this thickness, a tension of 0.75 pounds (341 gm) on a 3.5 inches (88.9 mm) transfer drum, a maximum radial edge deformation away from the center of the transfer drum is calculated to be approximately 0.000310 inches (0.00787 mm) and to extend approximately 0.075 inches (1.91 mm) toward the center of the web, a significant deformation for this application. In comparison, the thin master web with a polyester base at a tension of 1.0 pounds (454 gm) on the same drum is calculated to experience only a 0.00000075 inches (0.0000191 mm) deformation; that is, essentially no curl. Actual laboratory measurements were similar.

The thin master web preferably also is 0.005 to 0.020 inches (0.127 to 0.508 mm) narrower than the thicker slave web. Thus by wrapping master web 54 onto slave web 14 in the signal transfer zone, as shown in FIG. 10, the essentially uncurled or flat master web will nest into the anticlastically deformed slave web with the edges of the master web against those of the slave web. Thus, the deformed edges of the slave web act to ensure an improved interface between the edges of the master and slave webs where transfer is particularly desired for photographic applications.

At the outset of duplicating operations, the front plate 78 is removed and the master and slave webs are threaded around the rollers and the drum. Then the slave drive is started using the vacuum drum 38. The vacuum is then applied to ports 104, 106 and bias head 70 is energized. If it is desired to change the information which is transferred to slave web 14, master recording head 72 may be moved into contact with master web 54 to change the information as the loop of master web rotates. Other variations and modifications, within the scope of the invention, will undoubtedly suggest themselves to those skilled in the art. Accordingly, the foregoing description should be taken as illustrative and not in a limiting sense.

Having described our invention in sufficient detail to enable those skilled in the art to make and use it, we claim as new and desire to obtain Letters Patent of the United States for:

1. Apparatus for anhysteretically transferring signals from a first to a second recording medium carried respectively by first and second webs, comprising:

means for transporting the webs under tension along paths which converge to form a signal transfer zone wherein the webs are in intimate overlying contact;

a vacuum chamber upstream of the signal transfer zone between the converging webs, the chamber having edge walls defined in part by the webs as they converge and including a first drum having a first peripheral surface a segment of which extends through the signal transfer zone; a first roller having a second peripheral surface around a segment of which the first web is wrapped; the first drum and the first roller being in proximity with each other and defining a nip between the first and second webs where they come into intimate contact; the first and second webs being wrapped in intimate contact around the segment of the first peripheral surface downstream of the nip; and a second roller having a third peripheral surface around a segment of which the second web is wrapped, the third peripheral surface also defining an edge wall of the vacuum chamber;

first and second support plates having surfaces generally perpendicular to axes of rotation of the first drum and of the first and second rollers, the surfaces of the support plates facing each other and defining side walls of the vacuum chamber;

at least one vacuum port formed in at least one of the facing surfaces for exhausting the vacuum chamber in a direction transverse to the webs; and means for applying a decaying magnetic field to the webs in the signal transfer zone to cause the transferring.

2. The apparatus according to claim 1 wherein the second roller is in proximity with the first drum and the first roller, so that the vacuum chamber has a first apex at the nip, a second apex between the first drum and the second roller and a third apex between the first and second rollers.

3. The apparatus according to claim 2 wherein the at least one vacuum port has a generally triangular shape corresponding to a cross section of the vacuum chamber.

4. The apparatus according to claim 3 wherein the first and second support plates both have the vacuum port.

5. The apparatus according to claim 2 wherein the first and second rollers are spaced from each other adjacent to the third apex, the first web extending around the first roller at the third apex to define a leakage path into the vacuum chamber between the first web and the peripheral surface of the second roller; and means including the second web for rotating the second roller in a direction opposite to the first roller so that the peripheral surface of the second roller moves in a direction outwardly of the vacuum chamber and counteracts flow of air into the vacuum chamber via the leakage path.

6. The apparatus according to claim 1 further comprising:

side plates forming side walls of the vacuum chamber and a port in one of the side walls across which a length of the second web extends while traveling from the second roller to the nip, whereby vacuum applied to the port causes the length to move away from the drum and to droop across the port, the pressure in the vacuum chamber being variable in accordance with the extent of the droop across the port.

7. The apparatus according to claim 1 wherein the means for transporting further comprises:

a third roller having an axis of rotation, the third roller defining the path of the first web to the first roller, the third roller having annular flanges at the ends thereof, the flanges having inside surfaces for guiding the edges of the first web, the inside surfaces defining generally spherical arcs extending to steps generally perpendicular to the axis of rotation of the third roller.

8. The apparatus according to claim 1 wherein the first roller has a diameter much smaller than the diameter of the drum, the diameter of the first roller being sufficiently small to provide for separation of a boundary layer of air from the first web as it travels around the first roller.

9. The apparatus according to claim 1 wherein the drum and rollers are rotateable about parallel axes perpendicular to the paths of the webs, the first roller being gimballed for tilting movement about an axis transverse to the axis of rotation of the first roller to accommodate angular displacement of the side surfaces of the first web with respect to the peripheral surface of the drum.

10. The apparatus according to claim 1 wherein:

the second web is disposed against the first peripheral surface, whereby longitudinal edges of the second web curl radially outwardly due to anticlastic effect to form in the transfer zone a nest facing radially outwardly from the first peripheral surface; and the first web is disposed in the nest against the second web whereby longitudinal edges of the first web also curl radially outwardly due to anticlastic effect, the curl of the first web being much less than the curl of the second web, thereby aligning and increasing frictional coupling between the webs in the signal transfer zone.

11. The apparatus according to claim 10 wherein the width of the first web between its longitudinal edges is less than the width of the second web between its longitudinal edges.

12. The apparatus according to claim 1 wherein the first web is a magnetic record master having opposite side surfaces with a coating of magnetizable material on at least one of the opposite side surfaces; and the second web is a photographic film having opposite side surfaces with a coating of light sensitive material on one side surface and a magnetizable material on the other side thereof, the magnetizable material coated side of the master and the magnetizable material coated side of the photographic film facing each other as they converge; and the first peripheral surface has a circumferentially extending recess between rim surfaces on opposite sides of the recess, whereby the light sensitive coating is spaced from the first peripheral surface except at the rim surfaces while the webs pass through the signal transfer zone.

13. The apparatus according to claim 1, wherein the means for transporting the first web provides essentially constant tension in the signal transfer zone.

14. Apparatus for anhysteretically transferring signals from a first to a second recording medium carried respectively by first and second webs, comprising:
  means for transporting the webs under tension along paths which converge to form a signal transfer zone wherein the webs are in intimate overlying contact;
  a vacuum chamber upstream of the signal transfer zone between the converging webs, the chamber having edge walls defined in part by the webs as they converge and including a first drum having a first peripheral surface a segment of which extends through the signal transfer zone; a first roller having a second peripheral surface around a segment of which the first web is wrapped; the first drum and the first roller being in proximity with each other and defining a nip between the first and second webs where they come into intimate contact; the first and second webs being wrapped in intimate contact around the segment of the first peripheral surface downstream of the nip; and a second roller having a third peripheral surface around a segment of which the second web is wrapped, the third peripheral surface also defining an edge wall of the vacuum chamber;
  the second roller being in proximity with the first drum and the first roller, so that the vacuum chamber has a first apex at the nip, a second apex between the first drum and the second roller and a third apex between the first and second rollers; and
  means for applying a decaying magnetic field to the webs in the signal transfer zone to cause the transferring.

15. The apparatus according to claim 14 further comprising:
  first and second support plates having surfaces generally perpendicular to axes of rotation of the drum and of the first and second rollers, the surfaces of the support plates facing each other and defining side walls of the vacuum chamber;
  at least one vacuum port formed in at least one of the facing surfaces for exhausting the chamber, the port having a generally triangular shape corresponding to a cross section of the vacuum chamber.

16. The apparatus according to claim 15 wherein the first and second support plates both have the vacuum port.

17. The apparatus according to claim 14 wherein the first and second rollers are spaced from each other adjacent to the third apex, the first web extending around the first roller at third apex to define a leakage path into the vacuum chamber between the first web and the peripheral surface of the second roller; and means including the second web for rotating the second roller in a direction opposite to the first roller so that the peripheral surface of the second roller moves in a direction outwardly of the vacuum chamber and counteracts flow of air into the vacuum chamber via the leakage path.

18. The apparatus according to claim 14 further comprising:
  side plates forming side walls of the vacuum chamber and a port in one of the side walls across which a length of the second web extends while traveling from the second roller to the nip, whereby vacuum applied to the port causes the length to move away from the drum and to droop across the port, the pressure in the vacuum chamber being variable in accordance with the extent of the droop across the port.

19. The apparatus according to claim 14 wherein the means for transporting further comprises:
  a third roller having an axis of rotation, the third roller defining the path of the first web to the first roller, the third roller having annular flanges at the ends thereof, the flanges having inside surfaces for guiding the edges of the first web, the inside surfaces defining generally spherical arcs extending to steps generally perpendicular to the axis of rotation of the third roller.

20. The apparatus according to claim 14 wherein the first roller has a diameter much smaller than the diameter of the drum, the diameter of the first roller being sufficiently small to provide for separation of a boundary layer of air from the first web as it travels around the first roller.

21. The apparatus according to claim 14 wherein the drum and rollers are rotatable about parallel axes perpendicular to the paths of the webs, the first roller being gimballed for tilting movement about an axis transverse to the axis of rotation of the first roller to accommodate angular displacement of the side surfaces of the first web with respect to the peripheral surface of the drum.

22. The apparatus according to claim 14 wherein:
  the second web is disposed against the first peripheral surface, whereby longitudinal edges of the second web curl radially outwardly due to anticlastic effect to form in the transfer zone a nest facing radially outwardly from the first peripheral surface; and
  the first web is disposed in the nest against the second web whereby longitudinal edges of the first web also curl radially outwardly due to anticlastic effect, the curl of the first web being much less than the curl of the second web, thereby aligning and increasing frictional coupling between the webs in the signal transfer zone.

23. The apparatus according to claim 22 were in the width of the first web between its longitudinal edges is less than the width of the second web between its longitudinal edges.

24. The apparatus according to claim 14 wherein the first web is a magnetic record master having opposite side surfaces with a coating of magnetizable material on at least one of the opposite side surfaces; and the second web is a photographic film having opposite side surfaces with a coating of light sensitive material on one side surface and a magnetizable material on the other side thereof, the magnetizable material coated side of the master and the magnetizable material coated side of the photographic film facing each other as they converge; and the first peripheral surface has a circumferentially extending recess between rim surfaces on opposite sides of the recess, whereby the light sensitive coating is spaced from the first peripheral surface except at the rim surfaces while the webs pass through the signal transfer zone.

25. The apparatus according to claim 14, wherein the means for transporting the first web provides essentially constant tension in the signal transfer zone.

* * * * *